United States Statutory Invention Registration [19]

[11] Reg. Number: H468

Malik et al. [43] Published: May 3, 1988

[54] ALKALINE HARD-SURFACE CLEANERS CONTAINING ALKYL GLYCOSIDES

[75] Inventors: Arshad H. Malik; Robert S. McDaniel; Gilles M. L. Verboom, all of Decatur, Ill.

[73] Assignee: A. E. Staley Manufacturing Company, Decatur, Ill.

[21] Appl. No.: 801,170

[22] Filed: Nov. 22, 1985

[51] Int. Cl.[4] ..... C11D 7/32; C11D 7/12; C11D 7/06; C11D 3/26

[52] U.S. Cl. ..... 252/542; 252/153; 252/156; 252/158; 252/173; 252/174.17; 252/DIG. 14

[58] Field of Search ..... 252/174.17

[56] References Cited

U.S. PATENT DOCUMENTS

| | | | |
|---|---|---|---|
| 3,712,873 | 1/1973 | Zenk | 252/527 |
| 3,721,633 | 3/1973 | Ranauto | 252/527 |
| 4,147,652 | 4/1979 | Kaniecki | 252/152 |

OTHER PUBLICATIONS

R. E. Johnson and E. T. Clayton, "Formulation of Hard Surface Spray Cleaners", Detergents and Specialties, Jun. 1969, pp. 28 et seq.

*Primary Examiner*—John F. Terapane
*Assistant Examiner*—J. E. Thomas
*Attorney, Agent, or Firm*—Philip L. Bateman

[57] ABSTRACT

A soiled hard surface is cleaned by applying thereto and subsequently removing therefrom a cleaning composition comprising: (a) about 0.1 to 50 weight percent alkali metal hydroxide or ammonium hydroxide; (b) about 0.1 to 40 weight percent alkyl glycoside; and (c) about 10 to 95 weight percent water.

9 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ALKALINE HARD-SURFACE CLEANERS CONTAINING ALKYL GLYCOSIDES

FIELD OF THE INVENTION

This invention relates to hard-surface cleaners. More particularly, this invention relates to alkaline hard-surface cleaners containing alkyl glycosides.

BACKGROUND OF THE INVENTION

A. Hard-Surface Cleaners In General

Hard-surface cleaners are a class of cleaners specifically designed for application to hard, soiled surfaces and subsequent removal therefrom without an intermediate rinsing step. The desired properties for hard-surface cleaners are the rapid and effective emulsification of soil and the absence of significant or unsightly residual film on the surface after cleaning. Hard-surface cleaners are sometimes categorized into two classes: (1) household; and (2) institutional (also called industrial). The formulation of household hard-surface cleaners is generally constrained by toleration limits on skin irritation, odor, and fume toxicity. Institutional hard-surface cleaners are less constrained and tend to be more powerful. An overview of household and institutional hard-surface cleaners is found at Johnson, R. E. and Clayton, E. T., "Formulation of Hard Surface Spray Cleaners", *Detergents and Specialties*, June, 1969, pp. 28 et seq.

B. Alkyl Glycosides in Hard-Surface Cleaners

Alkyl glycosides have been employed as surfactants in hard-surface cleaners. A brief review of alkyl glycoside chemistry may be helpful before considering in detail the use of alkyl glycosides in hard-surface cleaners.

Monosaccharides are polyhydroxy aldehydes and polyhydroxy ketones which, when unsubstituted, have the chemical formula $C_nH_{2n}O_n$. Monosaccharides can join together, with the loss of water, to form chains of varying lengths. The length of a saccharide chain is commonly described either by adding a descriptive prefix to its name or by stating the chain's "degree of polymerization" (abbreviated to "D.P."). For example, glucose (also known as dextrose) is a monosaccaride having a D.P. of one; sucrose and maltose are disaccharides having a D.P. of two; and starch and cellulose are polysaccharides having D.P.'s of 1000 or more. The term "saccharide" encompasses unsubstituted and substituted molecules of any chain length.

Glycosides are substituted saccharides in which the substituent group is attached, through an oxygen, to the aldehyde or ketone carbon. Accordingly, glycosides are considered acetals. As with the term "saccharide", the term "glycoside" defines neither the number nor the identity of the saccharide units in the molecule. To describe the number of saccharide units, the same methods are used as outlined above. To describe the identity of the saccharide units, it is common to modify the name of the saccharide unit by adding the ending "-side". For example, a glucoside is a glycoside having one or more glucose units and a fructoside is a glycoside having one or more fructose units.

A variety of substituent groups can be attached to the saccharide. However, for surfactant use, long-chain (i.e., 8 to 25 carbon atoms) alkyl substituent groups are most commonly employed because the resulting glycosides are highly surface-active due to the hydrophilicity of their saccharide portions and the lipophilicity of their long-chain alkyl portions. It is also common for oxyalkylene groups to be attached between the saccharide and the long-chain alkyl group. For example, the compound having the following structure is a dodecyl (oxyethylene) glucoside of D.P.2:

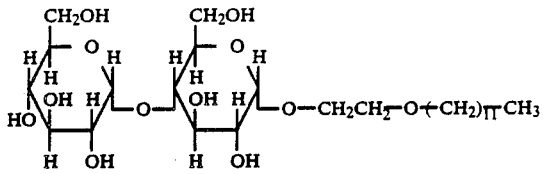

The above compound can be represented by the following formula:

$$RO—(R'O)_x—Z_y$$

where R is the dodecyl radical, R' is the ethylene radical, x is 1, Z is the glucose moiety, and y is 2.

The use of glycosides in hard-surface cleaner formulations has been disclosed in Malik, U.S. patent application Ser No. 06/696,688, filed Jan. 29, 1985; and Malik, U.S. patent application Ser. No. 06/706,561, filed Feb. 28, 1985. Malik '688 discloses a composition comprising: (a) about 0.1 to 50 weight percent of a nonionic surfactant component at least about 10 weight percent of which, on a total nonionic surfactant component weight basis, is a glycoside surfactant; (b) about 0.1 to 50 weight percent of a water miscible organic solvent; (c) about 0.1 to 50 weight percent of a water soluble detergent builder; and (d) about 10 to 99.7 weight percent water. Malik '561 discloses a hard-surface cleaning composition comprising: (a) about 0.05 to 50 weight percent of a glycoside surfactant; (b) about 0.025 to 50 weight percent of an amine oxide surfactant; (c) about 0.005 to 25 weight percent of a quaternary ammonium halide surfactant; (d) about 0.1 to 50 weight percent of a water soluble detergent builder; and (e) about 10 to 99.8 weight percent water.

C. Alkyl Glycosides in Alkaline Formulations

Although alkyl glycosides have not been used in alkaline hard-surface cleaners, they have been used in alkaline formulations designed for various other purposes.

Dupre, U.S. Pat. No. 3,653,095, issued Apr. 4, 1972, discloses a process for reducing the corrosion rate of alkali sensitive substrates (e.g., aluminum) when in contact with highly alkaline solutions. The process involves the addition of a corrosion inhibitor comprising: (a) at least one metal ion selected from the group consisting of barium, calcium, and strontium; and (b) a surfactant selected from a group including alkyl glucosides, to the alkaline solutions. The less-corrosive alkaline solutions disclosed in Dupre comprise 0.1 to 10 weight percent alkali metal hydroxide and about 0.01 to 5 weight percent surfactant and are allegedly useful "in a wide spectrum of applications including the metal working industry, cleaning equipment in food processing installations, maintenance cleaning of transportation vehicles, dish washing, and paint stripping operations".

Callahan, U.S. Pat. No. 3,865,628, issued Feb. 11, 1975, discloses a method of removing polymer residue from the surface of processing equipment used in the manufacture of terephthalate polyesters. The method involves a wash of the equipment with a hot (at least about 180° F.), aqueous potassium hydroxide solution comprising, inter alia, at least about 35 weight percent potassium hydroxide and up to about 1.5 weight percent of a surfactant stable in the solution. Callahan states that the presence of the surfactant is helpful in aiding the wetting and penetrating ability of the aqueous solution. A suitable surfactant is Triton BG-10 surfactant, an aqueous alkyl glucoside solution produced by Rohm & Haas Co.

Kaniecki, U.S. Pat. No. 4,147,652, issued Apr. 3, 1979, and Kaniecki, U.S. Pat. No. 4,240,921, issued Dec. 23, 1980, are derived from related applications. Each patent discloses concentrated alkaline solutions which, when diluted, are allegedly useful for washing bottles and other food and beverage containers. The Kaniecki 652 solution comprises, inter alia, about 10 to 35 weight percent alkali metal hydroxide and about 0 to 50 weight percent of a surfactant selected from a group including alkyl glucosides. The Kaniecki 921 solution comprises, inter alia, about 10 to 35 weight percent alkali metal hydroxide and about 10 to 50 weight percent of a two-component surfactant system. The first component of the surfactant system contains a polyoxyethylene group and the second component is selected from a group including alkyl glucosides. The weight ratio of the second component to the first component is about 5:1 to 10:1.

Miller, U.S. Pat. No. 4,230,592, discloses additives designed for addition to concentrated (50 percent) caustic soda solutions. The treated, concentrated solutions are then diluted with water and used for cleaning by dairies, canneries, and beverage plants where they allegedly exhibit hard water control, reduced scale buildup, and wetting ability for improved soil removal and rinsing properties. The additive comprises, inter alia, about 1.4 to 6.9 weight percent potassium hydroxide and about 1.4 to 11 weight percent alkyl glucoside. The additive is added to concentrated caustic soda solutions at the ratio of 1 to 6 gallons of additive per 30 gallons of solution.

SUMMARY OF THE INVENTION

The general objects of this invention are to provide an improved process for cleaning hard surfaces and an improved hard-surface cleaning composition.

We have discovered a process for cleaning a soiled hard surface by applying thereto and subsequently removing therefrom a cleaning composition comprising:

(a) about 0.1 to 50 weight percent alkali metal hydroxide or ammonium hydroxide;

(b) about 0.1 to 40 weight percent of an alkyl glycoside having the formula:

$$RO—(R'O)_x—Z_y$$

where R is a monovalent alkyl radical containing about 4 to 20 carbon atoms, O is an oxygen atom, R' is a divalent alkyl radical containing 2 to 4 carbon atoms, x is a number having an average value of 0 to about 12, Z is a reducing saccharide moiety containing 5 or 6 carbon atoms, and y is a number having an average value of about 1 to 10; and (c) about 10 to 95 weight percent water.

This process offers several advantages over previously employed processes. First of all, the cleaning rate of an alkaline hard-surface cleaner containing alkyl glycosides is superior to that of comparable cleaners containing a surfactant other than alkyl glycosides. Secondly, the performance of an alkaline hard-surface cleaner containing alkyl glycosides and a solvent is less dependent upon solvent concentration than comparable cleaners containing a surfactant other than alkyl glycosides. Thirdly, the presence of alkyl glycosides in an alkaline hard-surface cleaner facilitates the use of builders by improving their solubility.

We have also discovered a hard-surface cleaning composition comprising:

(a) about 0.1 to 8 weight percent alkali metal hydroxide or ammonium hydroxide;

(b) about 12 to 20 weight percent of an alkyl glycoside having the formula:

$$RO—(R'O)_x—Z_y$$

where R is a monovalent alkyl radical containing about 8 to 25 carbon atoms, O is an oxygen atom, R' is a divalent alkyl radical containing 2 to 4 carbon atoms, x is a number having an average value of 0 to about 12, Z is a reducing saccharide moiety containing 5 or 6 carbon atoms, and y is a number having an average value of about 1 to 10; and (c) about 60 to 85 weight percent water.

The composition, in its solvent-free form, exhibits a cleaning rate comparable to that of cleaners with solvent but which employ surfactants other than alkyl glycosides. This property is especially significant because of the undersirable effects (primarily odor and toxicity) of the solvents. Ths composition is also unique in that it is especially suited for the addition of one or more builders because of its ability to readily dissolve them.

DETAILED DESCRIPTION OF THE INVENTION

A. Use of the Cleaner

The alkaline, hard-surface cleaner of this invention is especially useful in cleaning greasy soil on a variety of hard surfaces. The cleaner is generally used by first applying it to the soiled surface and then removing it with a cloth or sponge. No rinsing is necessary because the cleaner leaves no objectionable residual film upon the surface.

For institutional use, the cleaner is generally formulated in a highly concentrated (low water) form. This enables the end user to employ the cleaner "as is" for very heavy-duty cleaning applications or to dilute it as desired for lighter-duty cleaning. Initially formulating the cleaner as a concentrate also reduces shipping charges by reducing shipping weights.

Less concentrated forms of the cleaner are generally formulated for household uses with the exact concentration depending upon the intended use. For example, oven cleaners tend to be more concentrated while glass cleaners tend to be less concentrated.

The formulation and use of the cleaner in various concentrations means that the water concentration in the cleaner varies widely. In particular, the water concentration varies from about 10 to 95 weight percent and is generally about 60 to 85 weight percent.

B. Alkali Metal or Ammonium Hydroxide

One component of the hard-surface cleaner of this invention is a source of alkalinity selected from the group consisting of alkali metal hydroxides (i.e., lithium hydroxide, sodium hydroxide, potassium hydroxide, etc.) and ammonium hydroxide. For heavy duty cleaning the preferred source of alkalinity is sodium hydroxide because it is the least expensive and most caustic member of the class. Ammonium hydroxide is preferred for glass cleaning because it leaves less residue on the glass than do the alkali metal hydroxides.

The alkali metal or ammonium hydroxide is present in the cleaner at a concentration of about 0.1 to 50 weight percent. Concentrations toward the higher end of this range are used in concentrates designed for dilution or for extremely heavy-duty cleaning. Concentrations toward the lower end of this range are used for light-duty cleaning. Concentrations of about 2 to 25, and especially about 5 to 15, weight percent are preferred for most general hard-surface cleaning applications.

C. Alkyl Glycosides

Another component of the hard-surface cleaner of this invention is an alkyl glycoside having the formula $RO—(R'O)_x—Z_y$ where R,O,R',x,Z, and y are as described below. Alkyl glycosides are commercially available and are generally prepared by reacting a saccharide with an alcohol in the presence of an acid catalyst.

The letter R represents a monovalent alkyl radical containing about 4 to 20 carbon atoms. This alkyl radical may be straight-chain or branched and saturated or unsaturated. The preferred alkyl groups are straight-chain, saturated, and contain 8 to 16 carbon atoms. The most preferred alkyl radicals include the decyl, undecyl, dodecyl (also known as lauryl), tridecyl, and tetradecyl (also known as myristyl) radicals.

The letter O represents an oxygen atom.

The letter R' represents a divalent alkyl radical containing 2 to 4 carbon atoms. The group (R'O) represents an oxy-alkylene repeating unit derived generally from ethylene oxide, propylene oxide, or butylene oxide. The most preferred oxy-alkylating agent is ethylene oxide because of its low cost and high reactivity. Accordingly, the preferred divalent alkyl radical is ethylene.

The letter x represents the number of oxy-alkylene units in the alkyl glycoside. The number varies from 0 to about 12. The addition of oxy-alkylene units to an alcohol prior to reaction with the saccharide is a convenient and inexpensive way to obtain the desired chain length for the alkyl portion of the glycoside.

The letter Z represents a reducing saccharide moiety containing 5 to 6 carbon atoms. The identity of the saccharide moiety is not critical to this invention and the choice is primarily dependent upon availability. Of the 5 to 6 carbon saccharides (pentoses and hexoses), the aldoses such as glucose and ribose are generally preferred over the ketoses such as fructose and ribulose. The most preferred saccharide unit is glucose considering its ready availability from starch.

The letter y represents the number of saccharide units (D.P.) in the glycoside. This number is important because it has a strong effect on the surface activity of the glycoside. Generally, surface activity of an alkyl glycoside is maximized when the hydrophilicity of the saccharide chain balances the lipophilicity of the alkyl chain. With alkyl groups having 8 to 16 carbon atoms, the preferred average D.P. is about 1.0 to 5.0 and the most preferred average D.P. is about 1.0 to 3.0.

The alkyl glycoside is present in the cleaner at a concentration of about 0.1 to 40 weight percent. The preferred alkyl glycoside concentration is about 1 to 15 weight percent and the most preferred concentration is about 2 to 10 weight percent.

D. Solvent

Water-miscible organic solvents are suitable for use in the hard-surface cleaner of this invention. However, the benefits obtained from their use may not outweigh their drawbacks. The major benefit resulting from the use of solvents is improved cleaning. However, as shown in Example 3 below, the use of solvents in the hard-surface cleaner of this invention produces only marginally-improved cleaning. The major drawback to the use of solvents is their unpleasant odor and inhalation toxicity.

Suitable water-soluble organic solvents include alkylene glycols and/or ethers thereof such as ethylene glycol mono-n-butyl ether, ethylene glycol monomethyl ether, ethylene glycol monoethyl ether, ethylene glycol mono-n-hexyl ether, propylene glycol monomethyl ether, propylene glycol monoethyl ether, isopropylene glycol monoethyl or monopropyl or monobutyl ether, etc; polyalkylene glycols and/or ethers thereof such as diethylene glycol monoethyl or monopropyl or monobutyl ether, di- or tripropylene glycol monomethyl ether, di- or tripropylene glycol monoethyl ether, etc.; t-butyl alcohol; tetrahydrofurfuryl alcohol; N-methyl-2-pyrrolidone; and the like.

When employed, solvents are generally present at a concentration of about 1 to 15 weight percent. Concentrations in the lower end of this range are desirable to minimize odor and toxicity.

E. Builder

Water-soluble builders are also suitable for use in the hard-surface cleaner of this invention. The more common builders include the various water soluble alkali metal, ammonium or substituted ammonium phosphates, polyphosphates, phosphonates, polyphosphonates, carbonates, silicates, borates, polyhydroxysulfonates, polyacetates, carboxylates, and polycarboxylates. Preferred are the alkali metal, especially sodium, salts of the above.

Specific examples of suitable water soluble inorganic phosphate builders are sodium and potassium tripolyphosphate, pyrophosphate, polymeric metaphosphates having a degree of polymerization of from about 6 to 21, and orthophosphate. Examples of polyphosphonate builders are the sodium and potassium salts of ethylene-1, 1-diphosphonic acid, and the sodium and potassium salts of ethane-1-1-2, triphosphonic acid.

Examples of suitable water soluble nonphosphorus, inorganic builders for use herein include sodium and potassium carbonate, bicarbonate, sesquicarbonate, tetraborate decahydrate, and silicate having a molar ratio of $SiO_2$ to alkali metal oxide of from about 0.5 to about 4.0 preferably from about 1.0 to about 2.4

Water soluble, nonphosphorus organic builders useful herein also include the various alkali metal, ammonium and substituted ammonium polyacetates, carboxylates, polycarboxylates and polyhydroxysulfonates. Examples of polyacetate and polycarboxylate builders are the sodium, potassium, lithium, ammonium and substituted ammonium salts of ethylenediamine tetraacetic acid, nitrilotriacetic acid, oxydisuccinic acid, mellitic acid, benzene polycarboxylic acids, and citric acid.

Polycarboxylate builders suitable for use herein also include those described in Diehl, U.S. Pat. No.

3,308,067, issued Mar. 7, 1967. Such materials include the water-soluble salts of homo- and copolymers of aliphatic carboxylic acids such as maleic acid, itaconic acid, mesaconic acid, fumaric acid, aconitic acid, citraconic acid and methylenemalonic acid. Other builders include the carboxylated carbohydrates of Diehl, U.S. Pat. No. 3,723,322.

Other builders useful herein are sodium and potassium carboxymethyloxymalonate, carboxymethyloxysuccinate, cis-cyclohexanehexacarboxylate, cis-cyclopentanetetracarboxylate, phloroglucinol trisulfonate, water-soluble polyacrylates (having molecular weights of from about 2,000 to about 200,000 for example), and the copolymers of maleic anhydride with vinyl methyl ether or ethylene. Other suitable polycarboxylates of use herein are the polyacetal carboxylates described in Crutchfield, U.S. Pat. No. 4,144,226, issued Mar. 13, 1979, and Crutchfield, U.S. Pat. No. 4,246,495, issued Mar. 27, 1979.

Other detergency builder materials useful herein are the "seeded builder" compositions disclosed in Belgian Patent No. 798,856, issued Oct. 29, 1973. Specific examples of such seeded builder mixtures are: 3:1 wt. mixtures of sodium carbonate and calcium carbonate having 5 micron particle diameter; 2.7:1 wt. mixtures of sodium sesquicarbonate and calcium carbonate having a particle diameter of 0.5 microns; 20:1 wt. mixtures of sodium sesquicarbonate and calcium hydroxide having a particle diameter of 0.01 micron; and a 3:31 wt. mixture of sodium carbonate, sodium aluminate and calcium oxide having a particle diameter of 5 microns.

When employed, builders are generally present at a concentration of about 1 to 15 weight percent. Although many builders have limited solubility in alkaline hard-surface cleaners not containing alkyl glycosides, they are generally readily soluble at these concentrations in the hard-surface cleaner of this invention.

F. Other Components

Various other components can also be included in the hard-surface cleaner of this invention. Typically present in relatively minor amounts, these components include such additives as hydrotropes (e.g., water soluble salts of low molecular weight organic acids such as the sodium or potassium salts of toluene-, benzene-, or cumene sulfonic acid; sodium or potassium sulfosuccinate; etc.); perfumes, dyes or colorants; thickeners and/or soil suspensing agents (e.g. carboxymethyl cellulose, polyacrylates, polyethylene glycols having molecular weights of from about 400 to about 100,000); deodorizers; ammonia; germicides; antioxidants; aerosol propellants; and the like.

G. Examples

These Examples are illustrative only.

EXAMPLE 1

This example illustrates that the cleaning performance of an alkaline, hard-surface cleaner containing sodium hydroxide, sodium xylene sulfonate ("SXS"), and water with an alkyl glycoside surfactant is superior to that of comparable cleaners containing other types of surfactants.

Three alkaline hard-surface cleaners were prepared and tested. Each cleaner contained 5 weight percent sodium hydroxide, 10 weight percent surfactant, 3 weight percent SXS, and 82 weight percent water. The surfactant in the first cleaner was an alkyl glycoside consisting of a mixture of dodecyl and tridecyl glucosides having an average DP of 1.3. The surfactant in the second cleaner was Neodol 25-3s, a sodium linear alcohol ethoxysulfate ("LAES") anionic surfactant, which is a commercial product of the Shell Chemical Company. The surfactant in the third cleaner was Neodol 25-7, a linear alcohol ethoxylate ("LAE") nonionic surfactant, which is a commercial product of the Shell Chemical Company.

The alkaline hard-surface cleaners were tested using the following procedure. A "soil" was prepared by mixing 32 g beefstew, 2 egg whites, 60 g lard, 16 g sugar, and 74 g water. A stainless steel strip having a length of approximately 10 cm, a width of approximately 2.5 cm, and a thickness of about 3 mm was weighed and then immersed in the soil. The strip was then removed from the soil and placed in an oven at 450° F. for 45 minutes to bake the soil onto the strip. After baking, the strip was cooled and weighed. The strips contained, on average, about 0.4 g of soil.

The strips were then completely immersed in the alkaline hard-surface cleaners for varying lengths of time. After immersion, each strip was placed onto a paper towel which was spread out flat upon a table. A second paper towel was placed on top of the first, covering the strip. A 2.6 kg weight was then placed onto the second towel, directly over the strip. The strip was then pulled out at a constant speed from between the two paper towels. The strip was reweighed to determine the amount of soil which had been removed. The results are shown in Table 1. The values represent weight percent removal of soil.

TABLE 1

Comparison of Surfactants in Alkaline Hard-Surface Cleaner Formulations Without Solvent

| Surfactant in Cleaner | Time Immersed in Cleaner (min.) | | | | |
|---|---|---|---|---|---|
| | 2 | 4 | 6 | 8 | 10 |
| Alkyl Glycoside | 23 | 61 | 67 | 74 | 77 |
| Anionic (LAES) | 10 | 23 | 46 | 49 | 74 |
| Nonionic (LAE) | 16 | 36 | 43 | 54 | 55 |

The results in Table 1 show that the alkaline hard-surface cleaner containing alkyl glycoside was superior in cleaning to comparable hard-surface cleaners containing other surfactants.

EXAMPLE 2

This Example illustrates that the cleaning performance of an alkaline, hard-surface cleaner containing sodium hydroxide, SXS, solvent, and water with an alkyl glycoside surfactant is superior to that of comparable cleaners containing other types of surfactants.

Four cleaners were prepared and tested. Each cleaner contained 5 weight percent sodium hydroxide, 2 weight percent surfactant, 3 weight percent SXS, 8 weight percent Butyl Cellosolve solvent (an ethylene glycol mono-n-butyl ether sold by Union Carbide Corporation), and 82 weight percent water. The first cleaner contained dodecyl-tridecyl glucoside having an average DP of 1.3 as the surfactant. The second cleaner contained Neodol 25-3s, a LAES, and the third cleaner contained Neodol 25-7, a LAE. The fourth cleaner contained Miranol $J_2M$, a caprylic imidazoline amphoteric surfactant, which is a commercial product of the Miranol Chemical Company.

The testing procedure described in Example 1 was used. The results are shown in Table 2.

TABLE 2

Comparison of Surfactants in Alkaline Hard-Surface Cleaner Formulations With Solvent

| Surfactant in Cleaner | Time Immersed in Cleaner (min.) 2 | 4 | 6 | 8 | 10 |
|---|---|---|---|---|---|
| Alkyl Glycoside | 32 | 73 | 77 | 80 | 89 |
| Anionic (LAES) | 29 | 55 | 69 | 82 | 90 |
| Nonionic (LAE) | 30 | 37 | 51 | 77 | 90 |
| Amphoteric | 25 | 46 | 64 | 85 | 90 |

The results in Table 2 show that the alkaline hard-surface cleaner containing alkyl glycoside was superior (for immersion times less than 8 minutes) or nearly equal (for immersion times of 8 minutes or more) in cleaning to comparable hard-surface cleaners containing other surfactants.

EXAMPLE 3

This Example illustrates that the performance of an alkaline hard-surface cleaner containing alkyl glycosides is less dependent upon the presence and concentration of a solvent than comparable cleaners containing a surfactant other than alkyl glycosides.

The results from Examples 1 and 2 were compared to ascertain the decrease in cleaning which resulted when a formulation was changed from 2 weight percent surfactant and 8 percent solvent to 10 weight percent surfactant and no solvent. The comparison for the alkyl glycoside surfactant is shown in Table 3A.

TABLE 3A

Effect of Solvent on Alkyl Glycoside Formulation

| Formulation of Cleaner | Time Immersed in Cleaner (min.) 2 | 4 | 6 | 8 | 10 |
|---|---|---|---|---|---|
| 2% surf., 8% solvent | 32 | 73 | 77 | 80 | 89 |
| 10% surfactant | 23 | 61 | 67 | 74 | 77 |
| Decrease (%) | 28 | 16 | 13 | 8 | 13 |

The results of Table 3A show that the average decrease in cleaning upon the removal of solvent was about 16 percent (28+16+18+8+13/5).

The comparison for the anionic (LAES) surfactant is shown in Table 3B.

TABLE 3B

Effect of Solvent on Anionic (LAES) Formulation

| Formulation of Cleaner | Time Immersed in Cleaner (min.) 2 | 4 | 6 | 8 | 10 |
|---|---|---|---|---|---|
| 2% surf., 8% solvent | 29 | 55 | 69 | 82 | 90 |
| 10% surfactant | 10 | 23 | 46 | 49 | 74 |
| Decrease (%) | 66 | 58 | 33 | 40 | 17 |

The results of Table 3B show that the average decrease in cleaning upon the removal of solvent was about 43 percent.

The comparison for the nonionic (LAE) surfactant is shown in Table 3C.

TABLE 3C

Effect of Solvent on Nonionic (LAE) Formulation

| Formulation of Cleaner | Time Immersed in Cleaner (min.) 2 | 4 | 6 | 8 | 10 |
|---|---|---|---|---|---|
| 2% surf., 8% solvent | 30 | 37 | 51 | 77 | 90 |
| 10% surfactant | 16 | 36 | 43 | 54 | 55 |
| Decrease (%) | 47 | 3 | 16 | 30 | 39 |

The results of Table 3C show that the average decrease upon the removal of solvent was about 27 percent.

In summary, an alkaline hard-surface cleaner containing a LAES anionic surfactant was very dependent upon solvent concentration as shown by the 43 percent average decrease in cleaning when 2 percent surfactant and 8 percent solvent was replaced by 10 percent surfactant and no solvent. The LAE formulation was also dependent upon solvent concentration as shown by the 27 percent average decrease. The alkyl glycoside formulation was least dependent (16 percent average decrease) leading to the theory that the alkyl glycoside surfactant may also possess solvency properties.

EXAMPLE 4

This example illustrates that the presence of alkyl glycosides in an alkaline hard-surface cleaner facilitates the use of builders by improving their solubility.

Three cleaners were prepared. Each cleaner contianed 5 weight percent surfactant, 5 weight percent potassium hydroxide, 5 weight percent trisodium phosphate dodecahydrate, 10 weight percent sodium metasilicate pentahydrate, and 75 weight percent water. The surfactant in the first cleaner was an alkyl glycoside consisting of a mixture of nonyl, dodecyl, and tridecyl glucosides having an average C.P. of about 1.5. The surfactant in the second cleaner was Neodol 25-7. The surfactant in the third cleaner was Igepal CO-630, a nonyl phenol ethoxylate nonionic surfactant, which is a commercial product of the General Aniline and Film Corporation.

Each cleaner was mixed thoroughly and then observed at 25° to 90° C. for the presence of two phases. The first cleaner was homogeneous and stable throughout the temperature range. The second and third cleaners both exhibited two phases throughout the temperature range.

We claim:

1. A process for cleaning a soiled hard surface by applying thereto and subsequently removing therefrom a cleaning composition comprising:

(a) about 0.1 to 50 weight percent alkali metal hydroxide or ammonium hydroxide;

(b) about 0.1 to 40 weight percent of an alkyl glycoside having the formula:

$$RO—(R'O)_x—Z_y$$

where R is a monovalent alkyl radical containing about 8 to 25 carbon atoms, O is an oxygen atom, R' is a divalent alkyl radical containing 2 to 4 carbon atoms, x is a number having an average value of 0 to about 12, Z is a reducing saccharide moiety containing 5 to 6 carbon atoms, and y is a number having an average value of about 1 to 10; and (c)about 10 to 95 weight percent water.

2. The process of claim 1 wherein the cleaning composition comprises about 2 to 25 weight percent of alkali metal hydroxide, about 1 to 15 weight percent of the alkyl glycoside, and about 60 to 85 weight percent water.

3. The process of claim 2 wherein the alkali metal hydroxide in the cleaning composition comprises sodium hydroxide and the alkyl glycoside in the cleaning composition has the formula:

$$RO—Z_y$$

where R is a monovalent, straight chain, saturated alkyl radical containing about 8 to 16 carbon atoms, Z is a glucoside moiety, and y is a number having an average value of about 1.0 to 5.

4. The process of claim 3 wherein the cleaning composition additionally comprises:

(d) about 1 to 25 weight percent of a water-soluble organic solvent.

5. The process of claim 3 wherein the cleaning composition additionally comprises:

(d) about 1 to 25 weight percent of a water-soluble builder.

6. A hard-surface cleaning composition comprising:

(a) about 0.1 to 8 weight percent alkali metal hydroxide or ammonium hydroxide;

(b) about 12 to 20 weight percent of an alkyl glycoside having the formula:

$$RO—(R'O)_x—Z_y$$

where R is a monovalent alkyl radical containing about 8 to 25 carbon atoms, O is an oxygen atom, R′ is a divalent alkyl radical containing 2 to 4 carbon atoms, x is a number having an average value of 0 to about 12, Z is a reducing saccharide moiety containing 5 or 6 carbon atoms, and y is a number having an average value of about 1 to 10; and (c) about 60 to 85 weight percent water.

7. The cleaning composition of claim 6 wherein the alkali metal or ammonium hydroxide comprises sodium hydroxide and the alkyl glycoside has the formula:

$$RO—Z_y$$

wherein R is a monovalent, straight chain, saturated alkyl radical containing about 8 to 16 carbon atoms, Z is a glucoside moiety, and y is a number having an average value of about 1.0 to 5.

8. The cleaning composition of claim 7 additionally comprising:

(d) about 1 to 15 weight percent of a water-soluble organic solvent.

9. The cleaning composition of claim 7 additionally comprising:

(d) about 1 to 15 weight percent of a water-soluble builder.

* * * * *